(12) United States Patent
Luessem et al.

(10) Patent No.: US 8,214,479 B2
(45) Date of Patent: Jul. 3, 2012

(54) SCALABILITY AND REDUNDANCY IN AN MSC-SERVER BLADE CLUSTER

(75) Inventors: Volker Luessem, Erftstadt (DE); Frank Uretschlaeger, Herzogenrath (DE); Juergen Sauermann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/594,439

(22) PCT Filed: Nov. 26, 2007

(86) PCT No.: PCT/EP2007/062792
§ 371 (c)(1),
(2), (4) Date: Jan. 6, 2010

(87) PCT Pub. No.: WO2008/119397
PCT Pub. Date: Oct. 9, 2008

(65) Prior Publication Data
US 2010/0106855 A1   Apr. 29, 2010

Related U.S. Application Data

(60) Provisional application No. 60/909,544, filed on Apr. 2, 2007.

(51) Int. Cl.
*G06F 15/173* (2006.01)
(52) U.S. Cl. ....................................................... 709/223
(58) Field of Classification Search .................... 709/223
See application file for complete search history.

(56) References Cited

U.S. PATENT DOCUMENTS

| | | | |
|---|---|---|---|
| 6,091,953 A | 7/2000 | Ho et al. | |
| 6,249,801 B1* | 6/2001 | Zisapel et al. | 718/105 |
| 6,665,702 B1* | 12/2003 | Zisapel et al. | 718/105 |
| 6,718,359 B2* | 4/2004 | Zisapel et al. | 718/105 |
| 7,039,403 B2* | 5/2006 | Wong | 455/435.1 |
| 7,583,964 B2* | 9/2009 | Wong | 455/435.1 |
| 7,590,873 B2* | 9/2009 | Takahashi et al. | 713/300 |
| 7,802,017 B2* | 9/2010 | Uemura et al. | 709/250 |
| 7,814,210 B1* | 10/2010 | Mueller et al. | 709/227 |
| 7,822,862 B2* | 10/2010 | Slater et al. | 709/229 |
| 7,966,422 B2* | 6/2011 | Lund | 709/245 |
| 2002/0187790 A1* | 12/2002 | Papadimitriou et al. | 455/452 |
| 2005/0281216 A1* | 12/2005 | Varonen et al. | 370/328 |
| 2006/0064400 A1* | 3/2006 | Tsukerman et al. | 707/2 |
| 2006/0184349 A1* | 8/2006 | Goud et al. | 703/24 |

(Continued)

FOREIGN PATENT DOCUMENTS

EP   1 335 619 A   8/2003

*Primary Examiner* — Wing Chan
*Assistant Examiner* — Alicia Baturay

(57) ABSTRACT

This invention relates to the field of Telecommunications, in specific to a distribution mechanism for distributing calls within a Mobile Switching Center Server Blade Cluster. In particular, a method and a corresponding distributor entity for providing scalability and redundancy in blade cluster comprising a plurality of server blades of a telecommunication system are disclosed. The method comprises the steps of receiving a message of a subscriber comprising a unique subscriber identifier determining by use of the unique subscriber identifier a first value and determining by said first value a first server blade of said blade cluster, Further, by use of the unique subscriber identifier a second value is determined and by use of said second value a second server blade of said blade cluster, whereby the first server blade is excluded from being determined.

12 Claims, 5 Drawing Sheets

U.S. PATENT DOCUMENTS

2007/0083645 A1* 4/2007 Roeck et al. .................. 709/224
2007/0101022 A1* 5/2007 Schulz et al. ................. 709/244
2007/0266108 A1* 11/2007 Patterson et al. ............. 709/217
2007/0271309 A1* 11/2007 Witriol et al. ................. 707/201
2010/0009678 A1* 1/2010 Munoz Munoz et al. ...... 455/433

* cited by examiner

SCALABILITY AND REDUNDANCY IN AN MSC-SERVER BLADE CLUSTER

This application claims the benefit of U.S. Provisional Application No. 60/909,544, filed Apr. 2, 2007, the disclosure of which is fully incorporated herein by reference.

TECHNICAL FIELD

This invention relates to the field of Telecommunications, in specific to the field of server blade technology and its use within telecommunications. In particular, the invention relates to distribution mechanism for distributing calls within a Mobile Switching Center Server Blade Cluster.

BACKGROUND

Mobile Services Switching Center-Servers (MSC-Servers) as they exist today have a fixed number of processors. All mobile subscribers which are served by an MSC-Server are processed by the same processor(s).

The fixed number of processors and the fact that all subscribers are processed by the same processor lead to the following disadvantages:

Capacity enhancements are possible only by replacing hardware or adding additional nodes in the network—either one of the aforementioned capacity enhancement is visible in the network. Such addition of hardware, however, leads to a situation making reconfigurations in the network necessary. This is on the one hand time consuming and on the other hand expensive.

A failure of a processor leads to a temporary outage for all subscribers. In today's communication system even a temporary outage is not acceptable, even more since some customers require specified availabilities, which need to be guaranteed.

To achieve a redundant system, all processors need to be duplicated, but in this case a double failure leads to a temporary outage for all subscribers.

Furthermore, such systems are not used in a cost-effective manner, since they are not used in a uniform manner.

The basic idea of the MSC-Server blade cluster (100) is to have a variable number of blades (110-1,110-2, . . . 110-(n+m−1), 110-(n+m)) which offer MSC-Server functionality, so called MSC-Server blades, see FIG. 1*a*.

Each Server blade may offer a set of functions. These functions may encompass the function of a MSC-Server, a Gateway Mobile Services Switching Center (GMSC-Server) and a Visitor Location Register (VLR). All mobile subscribers which are served by a Server blade cluster (100) should be distributed over the available Server blades (110-1,110-2, . . . 110-(n+m)).

To achieve a redundant system, each subscriber can be served not only by one of the Server blades (110-1, 110-2, . . . 110-(n+m)) but by two or more.

Thus, a failure of one Server blade (110-1,110-2, . . . 110-(n+m)) can be compensated by other Server blade(s) of the affected subscriber.

By the usage of a signaling proxy (120-1,120-2), which may communicate with MSC-S blades (110-1,110-2, . . . 110-(n+m−1), 110-(n+m)) via an appropriate protocol such as SCTP/IP (300), the Server blades (110-1, . . . 110-(n+m−1), 110-(n+m)) may not be visible outside of the MSC-Server blade cluster (100) and other nodes may see the MSC-Server blade cluster (100) as a single node.

The signaling proxy (120-1,120-2) may communicate via any kind of interface offering one or more appropriate protocols such as Time Division Multiplex (TDM,130), Asynchronous Transfer Mode (ATM,140), Internet Protocol (IP,150) with respective networks such as a Radio Access Network (RAN,160) and/or a Core Network (CN,170).

Furthermore, the MSC-S Blade Cluster (100) may contain one or more interfaces (190-1,190-2,200-1,200-2) for Operation and Maintenance Functions for the Site Infrastructure and for the individual server blades (110-1,110-2, . . . 110-(n+m)) and/or the Signaling Proxy (120-1,120-2).

SUMMARY

Solutions for the following problems will be described in the following:
how to determine the Server blades for a subscriber, and
how to determine which one of the Server blades has to be chosen if a mobile subscriber needs to be processed.

The problem of determining the Server blades for a subscriber is solved by using a stateless distributor which determines the Server blades by using 2 or more hash-functions. The hash-functions may use a unique subscriber identifier such as the International Mobile Subscriber Identity (IMSI) or the Temporary Mobile Subscriber Identity (TMSI) as input.

In particular, this is solved by a method for providing scalability and redundancy in blade cluster of a telecommunication system, where a message of a subscriber is received and said message comprises a unique subscriber identifier (IMSI). By use of said unique subscriber identifier (IMSI) a first value (hash 1, TMSI) is determined. This first value is than used to determine a first server blade of said blade cluster. Furthermore, by use of said unique subscriber identifier (IMSI) a second value (hash 2, TMSI) is determined. This second value is than used to determine a second server blade of said blade cluster. However, for the determination of a second server blade, the previously determined first server blade is excluded.

Obviously, said method can be embodied in software operable when executed on a Computer.

Furthermore, said innovative idea may be embodied in a Distributor entity for providing scalability and redundancy in blade cluster of a telecommunication system. Such a Distributor entity comprises means for receiving a message of a subscriber comprising a unique subscriber identifier (IMSI), means for determining by use of the unique subscriber identifier a first value (hash 1, TMSI).

The means for determining are adapted to determine by said first value (hash 1, TMSI) a first server blade of said blade cluster, and to determine by use of the unique subscriber identifier a second value (hash 2, TMSI). Again, said means for determining are further adapted to determine by use of said second value (hash 2, TMSI) a second server blade of said blade cluster, whereby the first server blade is excluded from being determined The problem of determining which one of the Server blades has to be chosen if a mobile subscriber needs to be processed is solved by defining one of the Server blades as the active blade for a subscriber. The active blade will typically be used to process a subscriber. Once an active blade is defined, it could remain the active blade until it's not able anymore to process a subscriber for a certain time, e.g. due to a temporary failure or an overload situation, etc. During that time another Server blade can become the active blade if the mobile subscriber needs to be processed.

DETAILED DESCRIPTION

Using IMSI

In the following example an IMSI is used as an example of a unique subscriber identifier. The solution presented is however not limited to IMSI but is susceptible of any kind of unique subscriber identifier.

a) Stateless Distributor

Figure 1:
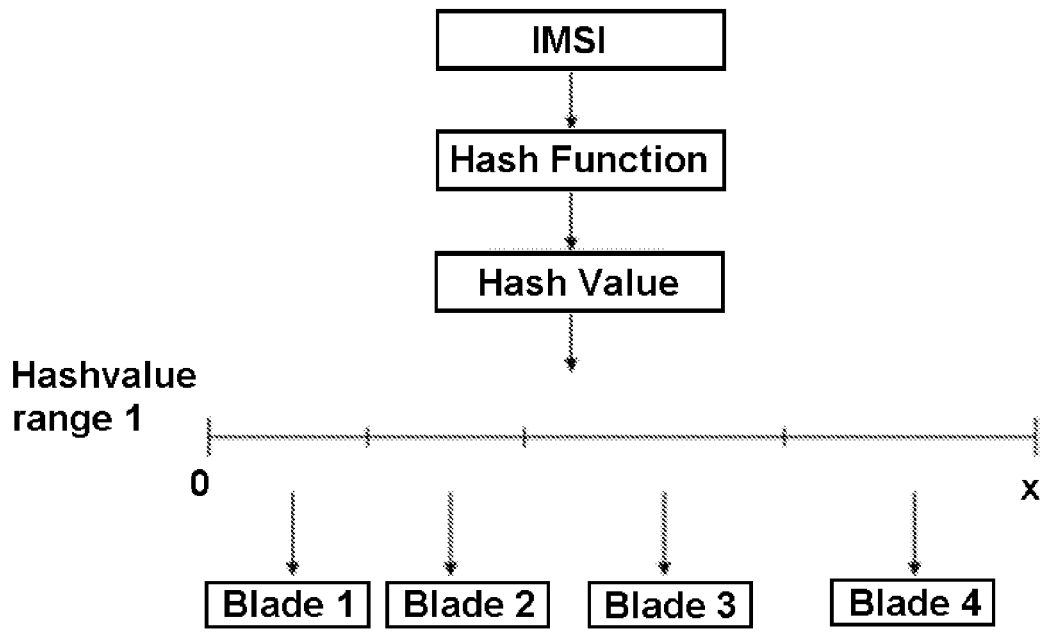
FIG. 1 shows an exemplary distribution flow for a primary blade according to the invention.
Figure 3:
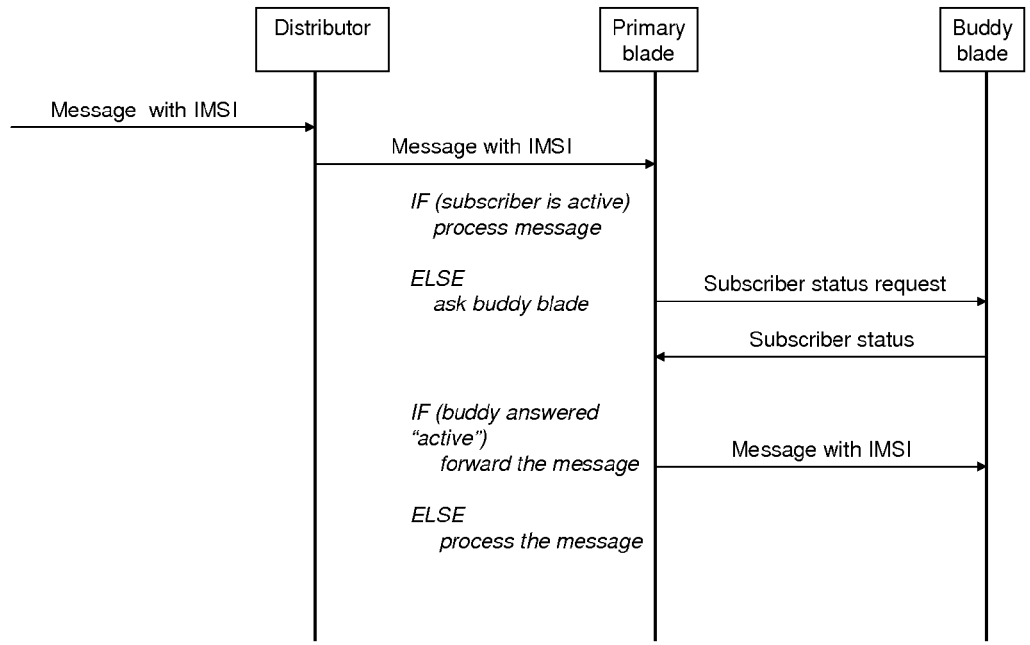
FIG. 3 shows an exemplary message flow if a single buddy is present according to a first embodiment of the invention.
Figure 4:
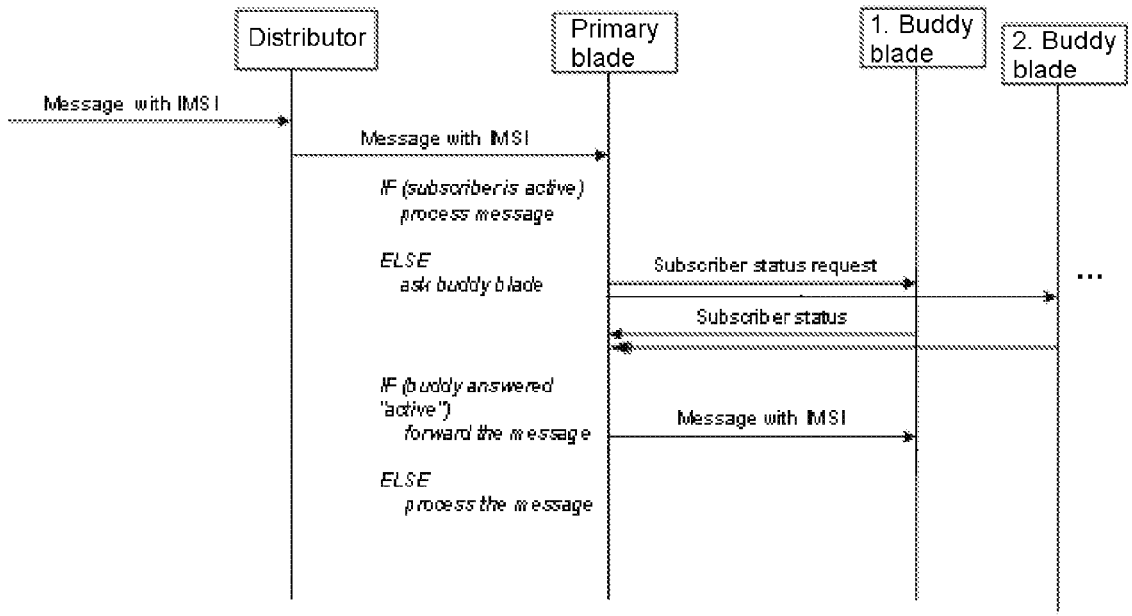
FIG. 4 shows an exemplary message flow if multiple buddies are present according to a second embodiment of the invention.

In accordance with FIGS. 1, 3 and 4, a message of a subscriber is received comprising a unique subscriber identifier.

As mentioned above, the two or more Server blades which can process a mobile subscriber are determined by using 2 or more hash-functions. The unique subscriber identifier is used as an input to a hash-function which than outputs a hash value (hash 1)

The hash-value range of the hash-function, i.e. the range of possible values for all possible input values such as the unique subscriber identifier for determining the first blade is partitioned into sub-ranges per Server blade. Thus, the unique subscriber identifier such as the IMSI of a subscriber leads via its hash-value (hash 1) in a mapping process to the first MSC-Server blade which can process this subscriber. This blade is the so called primary blade. See FIG. 1.

The further blade server which can process a subscriber may be determined in the same way using a second hash-function, i.e. the unique subscriber identifier is used as an input to a hash-function which than outputs a hash value (hash 2).

The hash-value range of the hash-function, i.e. the range of possible values for all possible input values such as the unique subscriber identifier for determining the further blade is partitioned into sub-ranges per Server blade. Thus, the unique subscriber identifier such as the IMSI of a subscriber leads via its hash-value (hash 2) in a mapping process to a further MSC-Server blade which can process this subscriber. This blade is a so called further blade or buddy blade. In the following, the terminology "buddy" is an alternative wording for a "further" blade server. See FIG. 2.

The used hash-functions for determining primary and one or more further server blade(s) may be different or identical.

In a preferred embodiment the hash-functions are different for that the likelihood of choosing adjacent blades is reduced.

In order to provide for a load distribution, it is foreseen to take the processing power into account. The processing power may reflect certain processing capabilities such as processing speed, memory, cache, etc. This can be dealt with in several ways of which two are explained exemplary in the following.

For example, it is possible to choose a non-uniform hash-function which would map the input values on the hash-value range 0 to x in a non-uniform manner. Although in the following the hash-range is described as starting at 0 and ending at x, the range depends only on the used hash-function.

The hash-value range would than be mapped on the respective blades in an almost uniform manner, e.g. the hash value range 0 to x would be substantially uniformly divided among the respective blades within the cluster.

Another, preferred example, is the following:

If there are blade server s with different processing power, this may also be reflected in different sizes of the sub-ranges.

A blade server with higher processing power may cover a larger sub-range, thus it will process more subscribers. In this arrangement a more or less uniform hash-function is preferred.

Obviously, also other combinations could be use which provide for a load distribution.

With respect to the two—or more as described later—hash-functions used for determining the primary and the buddy there is a difference though.

The hash-value range of the second hash-function, which could be different to the first one, should be partitioned into sub-ranges per Server blade excluding the primary blade. In doing so, it is avoided that the hash-functions may determine the same Server blade as primary and buddy Server blade.

If both hash-functions would lead to the same Server blade, there would be no redundancy.

The partitioning of the hash-value range to determine the second MSC-Server blade or further blade should be done as many times as there are MSC-Server blades foreseen for a subscriber, i.e. two or more.

The second MSC-Server blade is the so called buddy blade. See FIG. 2 for an understanding of how a buddy server blade may be determined depending on the primary server blade and a second partitioned hash-value range.

Figure 2:
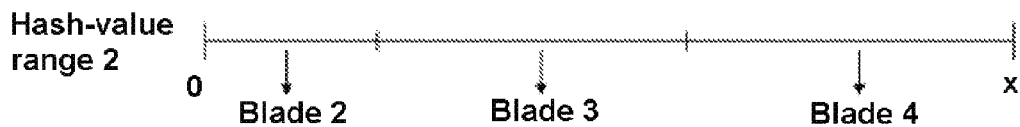
FIG. 2 shows an exemplary distribution flow for a further, so called buddy blade according to the invention.
Figure 2:
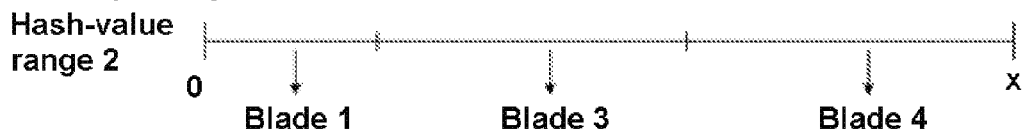
Figure 2:
Figure 2:
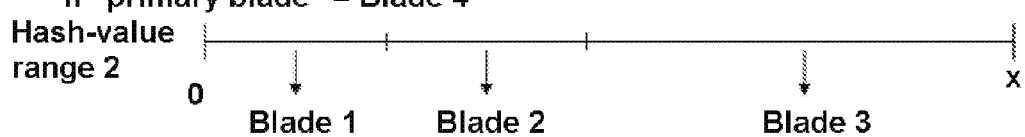

In FIG. 2 it is shown that depending on a determined primary buddy, the second hash-value range addressed via a (second) hash-function can be again partitioned into sub-ranges per Server blade excluding the primary blade.

For a more detailed discussion, it is assumed that there are 4 server blades within a blade cluster and each subscriber is associated to a primary and a buddy server blade.

In the following it is assumed that as the primary blade Blade 3 is determined as shown in the lower portion of FIG. 2. Than the hash value range 2 is partitioned, into 3 portions excluding Blade 3. Because of different properties of the server blades, the sub-ranges are not equal, i.e. blade 4 covers a bigger portion of the hash value range 2 than blades 1 and 2.

Further buddy blades, i.e. for providing more redundancy, could be determined by a similar process, whereby the hash-function should be partitioned into sub-ranges per Server excluding previously determined blades, e.g. the primary server blade and all previously for the subscriber determined buddy blades. Such a situation is also encompassed in FIG. 1*a*, where M is chosen to be greater than 1.

It should be mentioned that the primary blade is typically the blade that usually processes a subscriber.

If it becomes unavailable and a subscriber needs to be processed during the unavailability, a buddy blade will process the subscriber.

The primary or buddy blade processing a subscriber is referred to in the following as the active blade.

A process which can be used for returning the subscriber to its initial primary server blade may be based on the following.

An active buddy blade will process the subscriber only until the next location update of the subscriber is received.

When a location update or any other appropriate message is received on the active buddy blade, the active buddy blade forwards the initial message for the location update to the primary blade (assuming that the primary blade is available again). From that point in time the primary blade processes the subscriber again. Such a handling offers some benefits such as:

There is a "default blade" which "most of the time" processes a subscriber, i.e. the primary blade.

VLR data handling becomes easier, since VLR data replication may be done only in one direction.

Moving back to the primary blade only at location update causes least interference problems (e.g. subscriber data can easily be fetched from the HLR if needed)

The process for returning as described above could be used every time when an initial (included in a connection request) message with IMSI is received from a Radio Access Network—nodes, e.g. Base Station Controllers (BSC), or service nodes, e.g. Home Location Registers (HLR). When the primary blade and a buddy blade have been determined and are available, it should be checked which one of the blades is the active blade.

The function of determining the primary and further blades may be embodied in a distributor.

The distributor is an entity that in accordance with FIGS. 3 and 4 comprises means for receiving an initial subscriber related message in the Server blade cluster, and means for storing the information which subscriber is processed by which Server blade(s). Furthermore, the distributor comprises means for sending messages towards other blades and/or a signaling/proxy.

The distributor might be centralized or in a preferred embodiment distributed onto one or more of the Server blades. In a most preferred embodiment, each blade comprises a Distributor.

By distributing the distributor, the distributor is no single point of failure or capacity bottleneck with this solution because there are several instances of the distributor which can be used.

Each instance of the distributor may calculate the sub-ranges independently. However, also a centralized calculation of the sub-ranges may be envisaged. Than, the sub-ranges need to be provided to the distributors.

In further embodiments, the actual processing-power of the blades might be taken into account. If, due to a change in actual processing power, a change in the sub-ranges would be necessary, there would also arise the need to redistribute already distributed subscribers with respect to their primary and/or buddy blades.

b) Determining the Active blade

The information whether a Server blade is the active blade for a subscriber is stored in the VLR.

The VLR might be centralized or in a preferred embodiment distributed onto one or more of the Server blades. In a most preferred embodiment, each blade comprises a VLR together with the subscriber data.

By distributing the VLR, the VLR is no single point of failure or capacity bottleneck with this solution because there are several instances of the VLR which can be used.

However, in an alternative embodiment, a single VLR for the whole Blade cluster is foreseen.

Only one of the blades can be the active blade at the same time. A blade is set to active for a subscriber when the blade starts to process a subscriber and it was not active yet.

The distributor should send the message to the primary blade (assuming that it's available), see FIG. 3 and FIG. 4. Then the primary blade checks if it's the active blade for the subscriber. If it is the active blade for the subscriber, it just starts to process the message. If it's not the active blade for the subscriber as it is shown in FIGS. 3 and 4, it must check whether a buddy blade is the active blade. It does so by sending a message to the buddy blade as shown in FIG. 3 or to the buddy blades as shown in FIG. 4.

Obviously, the way the buddy blades are queried might be arranged differently, i.e. the first buddy may as well as the primary blade detect that it is not the active blade for the subscriber and therefore check whether a further buddy blade is the active blade. It does so by sending a message to the further buddy blade. Than however, the querying buddy blade will not report a status until it has not received a status from the further buddy blade.

The buddy blade(s) answer with a message whether it is active or whether they are not active. If a buddy blade is active, the primary blade forwards the previously received subscriber message to the active buddy blade and the active buddy blade processes the message.

If no buddy blade is active, the primary continues to process the message and becomes active.

The described handling of sending a message to the primary blade instead of letting the distributor check which of the MSC-Server blades is active has the advantage that "most of the time" no signaling is needed because "most of the time" the primary blade is the active blade. This is also true considering the return procedure as described above.

If the distributor receives an initial subscriber related message while the primary blade is not available, the distributor forwards the message immediately to the buddy blade(s).

A Server blade may offer an "active" flag which could be removed for all or some subscribers when it's getting unavailable or loaded because other blade(s), i.e. the buddy blades might become the active blade during the unavailability.

Using TMSIs

In the following TMSI is used as a further example of a unique subscriber identifier. The solution presented is however not limited to TMSI but is susceptible of any kind of unique subscriber identifier.

Since subscriber related messages can contain a Temporary Mobile Subscriber Identity (TMSI) instead of an IMSI, there should be also a mechanism to identify the correct Server blades of a subscriber based on a received TMSI.

A TMSI could be allocated to a subscriber after having received a message containing an IMSI. Such an allocation can be understood as a mapping as performed by a hash function.

Again, the solution is to partition the whole available TMSI range into TMSI ranges per MSC-Server blade.

Also here the processing power of the MSC-Server blades can be taken into account as described previously. For example, a Server blade with a higher processing power will get a larger TMSI range, see FIG. 5, where Blade 3 and Blade 4 cover a larger sub-range of the TMSI range than Blade 1 and Blade 2.

Whenever a primary or buddy MSC-Server blade (110-1, 110-2, . . . 110-(n+m−1), 110-(n+m)) starts to process a subscriber, it allocates a TMSI from its own TMSI range. Thereby, the TMSI allocated to a subscriber points directly to the active MSC-Server blade of a subscriber, which can be either the primary or the buddy blade.

To be able to find also any other Server blade which can process a subscriber if the active blade is not available, the TMSI range of each Server blade is further divided into TMSI sub-ranges. Since the other Server(s) blade shouldn't be the same as the active blade. otherwise there wouldn't be any redundancy, there is as described before a corresponding TMSI sub-range for each MSC-Server blade, excluding the active blade, see FIG. 6 and FIG. 7.

Figure 6:
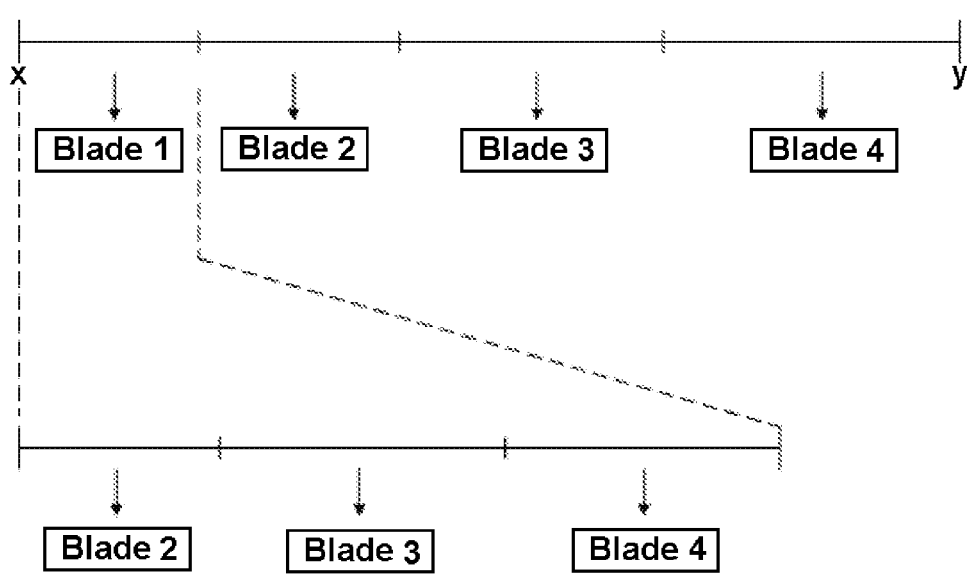
FIG. 6 shows an exemplary distribution for a buddy blade according to a first embodiment of the invention.

In FIG. 6 it is shown that depending on a determined primary buddy, the TMSI-value range addressed can be again partitioned into sub-ranges per Server blade excluding the primary blade.

For a more detailed discussion, it is assumed that there are 4 server blades within a blade cluster and each subscriber is associated to a primary and a buddy server blade.

In the following it is assumed that as the primary blade Blade 1 is determined as shown in FIG. 6. Than the TMSI value range is again partitioned, into 3 portions excluding Blade 1. Hence, by mapping the TMSI range onto the remaining blades again it is possible to uniquely identify further blades able to process a subscriber if the primary blade fails.

Obviously, the distribution could be done either by simply mapping the TMSI sub-range onto the remaining blades, i.e. the sub-range would be partitioned again like for determining the primary buddy or any other suitable function could be taken into account.

Again, the processing power could be taken into account. E.g. in FIG. 6, the TMSI sub-range of Blade 1 is mapped onto a range which is of the same size as for the TMSI range for Blade 2, Blade 3 and Blade 4. Since the processing power of Blade 3 and Blade 4 is higher than the one of Blade 1 and Blade 2, the assigned sub-ranges are bigger with respect to the later ones.

In the following it is assumed that the processing power of Blade 3 and 4 is approximately twice the processing power of Blades 1 and 2. Than a simple means could be to partition the TMSI range [x,y] into 4 portions whereof the portion assigned to blades 1 and 2 together is of substantially the same size as the portion for blade 3 or blade 4. Taking this distribution into account, it is another possibility to partition the sub-range again according to the same principle, i.e. the sub-range slice of blade 2 is half the size of the sub-range slice of blade 3 or blade 4.

Figure 7:
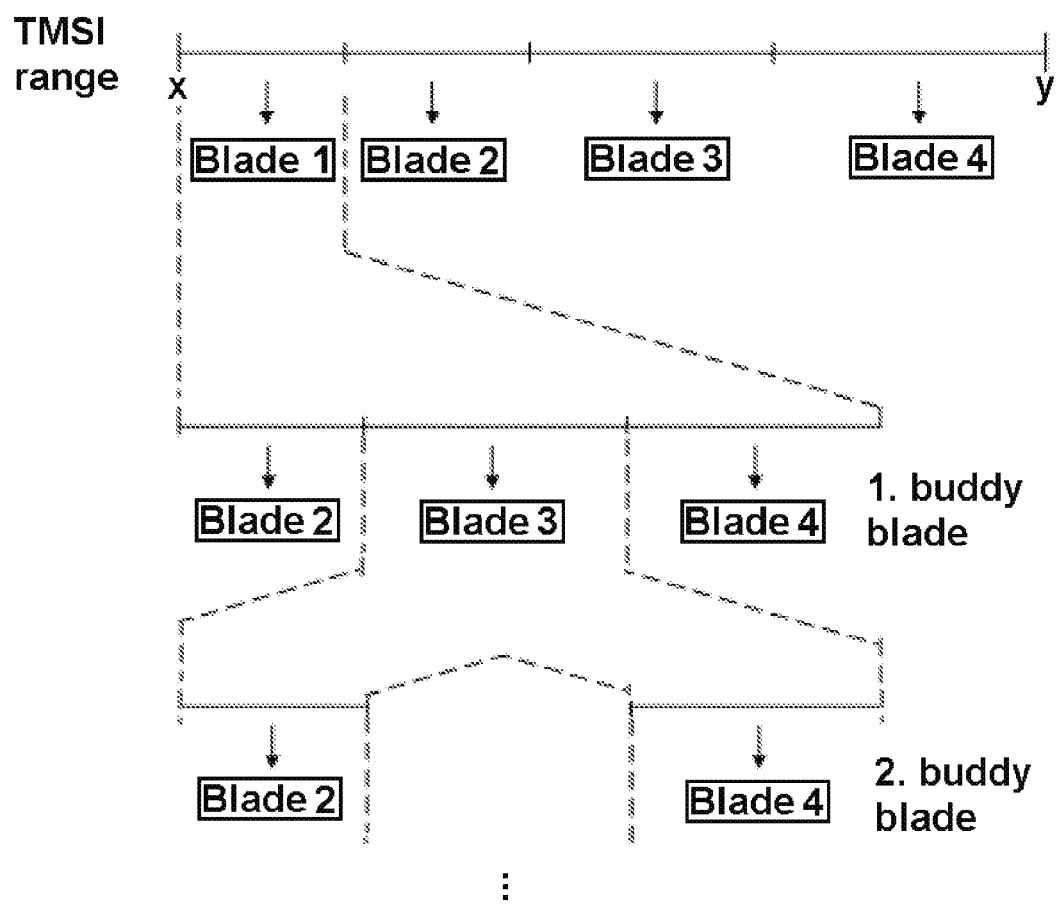
FIG. 7 shows an exemplary distribution for a primary blade and a first and second buddy blade according to a second embodiment of the invention.

Hence, one could identify two constraints for allocating a TMSI:
 A TMSI should be allocated from the TMSI range of the blade processing a subscriber (the active blade)
 A TMSI range is further portioned for allocating further Server blade(s) which could process a subscriber Taking into account, that one might prefer to have more redundancy than in a N:1 relation, e.g. a N:2 relation where for each Server blade 2 fallback plates are assigned, in the following FIG. 7 is described.

Figure 5:
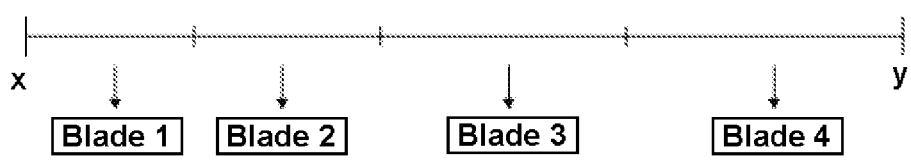
FIG. 5 shows an exemplary distribution for a primary blade according to a first embodiment of the invention.

There, again the TMSI range is portioned as already shown and discussed in connection with FIG. 5. It is however in FIG. 7 assumed, that blade 3 is determined as a first buddy blade. Since the goal is to have in the case that both, the primary blade as well as the first buddy blade fails a possibility to process a subscriber another, a second buddy blade is assigned. Again, the same principle as described above is employed, i.e. the blades already assigned for a subscriber are not taken into account while the sub-range is again mapped on the remaining blades. I.e. since blade 3 is assigned as a $1^{st}$ buddy blade, only blade 2 and blade 4 remain available for distribution. Obviously, the distribution could be done either by simply mapping the TMSI sub-range onto the remaining blades, i.e. the sub-range would be partitioned again like for determining the primary buddy or any other suitable function could be taken into account.

When a distributor receives a (initial) subscriber related message with TMSI, it should determine the active Server blade by checking the TMSI ranges. If this blade is available, the distributor forwards the message to this blade. If it's unavailable, it determines a further Server blade by checking the TMSI sub-ranges and forwards the message to this blade (assuming that this blade is available), and so on.

If the (initial) subscriber related message is a Location Updating Request, the distributor checks the old Location Area Information (LAI), i.e. the LAI that has been stored on the SIM of the Mobile Station (MS) at the last location updating before it checks the TMSI. If the old LAI is defined as own LAI in the Server blade cluster (100), the TMSI was earlier allocated by the Server blade cluster (100) and could be used for distribution. Otherwise the IMSI of the subscriber is fetched from the MS and then the initially received message is distributed based on the IMSI.

If a (initial) subscriber related message with TMSI is distributed to the wrong blade (e.g. if it's a call setup but the TMSI was allocated by another MSC-Server), a redistribution of the message will be done when the IMSI of the subscriber is known and trusted, e.g. after authentication.

In a preferred embodiment, the distribution via IMSI and a corresponding TMSI of the same subscriber results in the same Server blades of course.

The invention therefore provides in the described embodiments one or more advantages, which can be summarized as follows:

A capacity increase/decrease is possible by simply adding/removing Server blades and (automatically) changing the partitioning of the hash-value ranges and/or TMSI ranges. Therefore, the capacity change is not visible in the network.

A failure of a processor or a blade could be compensated by other MSC-Server blades.

Therefore, it's not needed to duplicate the complete hardware to get redundancy.

Even double failure would not lead automatically to a temporary outage of subscribers in a system having more than one buddy blade defined.

Even in the case that only one buddy is defined and two blades are out of order, such a failure will lead only to temporary outage of a limited number of subscribers. The number is much lower than in traditional set-ups since typically there are more blades available so that the probability that a subscriber is served by exactly these blades decreases with an increasing number of blades.

Figure 1A:
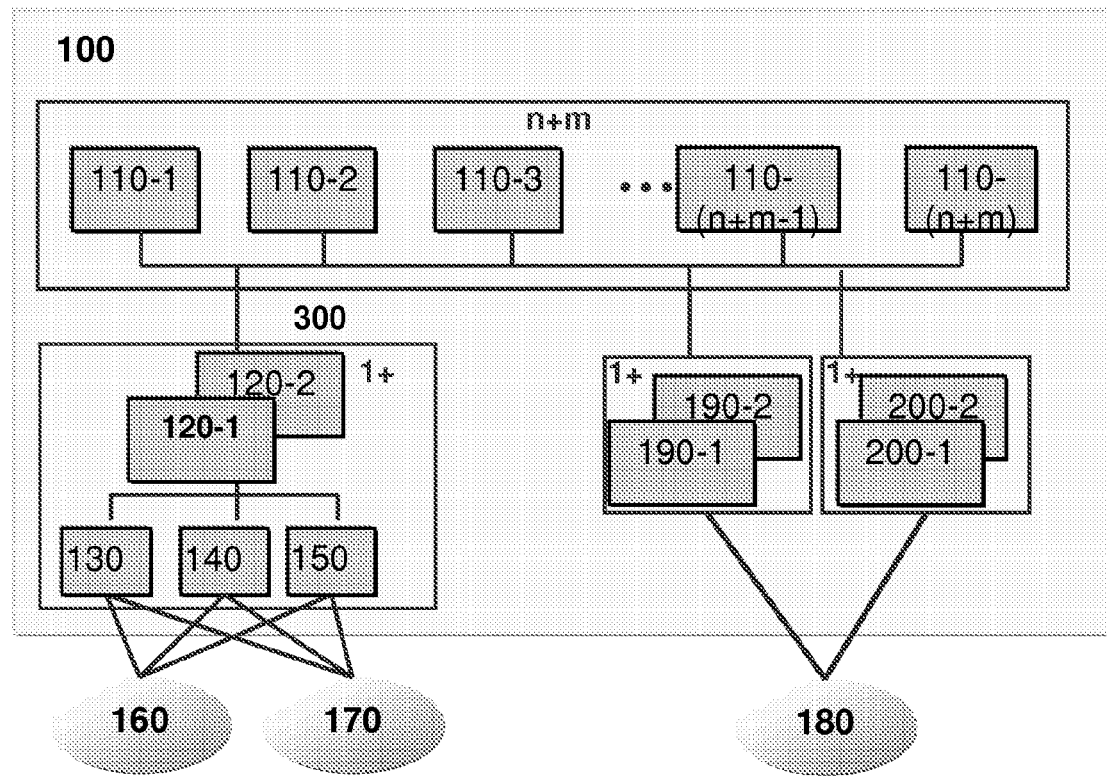
FIG. 1*a* shows exemplary MSC-Server blade cluster according to the invention.
Figure 1B:
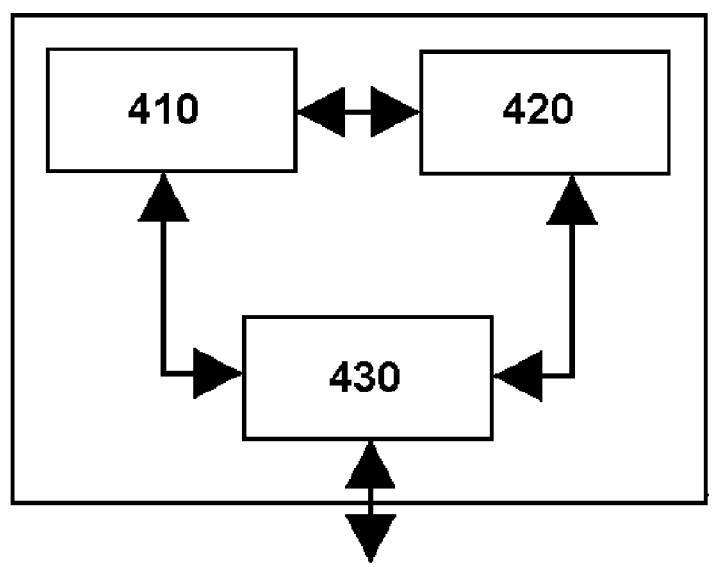
FIG. 1*b* shows exemplary a setup of a server blade of a blade cluster according to the invention.

As shown in FIG. 1a, also the signaling proxy and the one or more interfaces (190,200) for Operation and Maintenance Functions for the Site Infrastructure and for the individual blades may offer redundancy by providing two (190-1,190-2,200-1,200-2) or more entities offering the functionality.

As discussed previously, a VLR is envisaged on each blade. However, in an alternative embodiment also a centralized VLR may be envisaged. Also this VLR may offer redundancy as explained above with respect to the signaling proxy.

Typically a server blade (110) comprises a processor (410) by which the distribution function is offered, i.e. the hash-functions may be performed, a memory (420) offering space for a VLR database, and I/O interfaces (430) providing the server blades with ability to communicate either with other blades within the same blade clusters, e.g. for data replication reasons (VLR data replication), the signaling proxy/proxies (120,120-1,120-2) and the one or more interfaces (190,200) for Operation and Maintenance Functions for the Site Infrastructure and for the individual blades may offer redundancy by providing two (190-1,190-2,200-1,200-2) or more entities offering the functionality.

Obviously, an I/O interface (430) could be embodied by any kind of Network Interface Card or unit, while the processor (430) could be any kind of a processor including a Digital Signal Processor (DSP) or controller or may even be embodied in an ASIC or a FPGA Furthermore, the memory (420) may be embodied in different kind of memory either as a electronic memory such as RAM, EPROM, EEPROM, or storage device such as any kind of optical or magnetic storage medium.

Obviously, all the methods as presented above may be embodied in hardware, software enabled hardware and software offering the corresponding program logic itself when run on a corresponding programmable device, either in part or as a whole.

The invention claimed is:

1. A method of providing scalability and redundancy in a blade cluster of a telecommunication system, the blade cluster acting towards the telecommunication system as a single Mobile Switching Center (MSC) and comprising a plurality of server blades, a server blade offering MSC-Server functionality, the method comprising the steps of:
receiving from the telecommunication system, a message relating to a subscriber, the message including a unique subscriber identifier;
determining a first hash value utilizing the unique subscriber identifier;
based on the first hash value, determining a first server blade of said blade cluster;
determining a second hash value utilizing the unique subscriber identifier; and
based on the second hash value, determining a second server blade of said blade cluster while excluding the first server blade, said second server blade serving the subscriber if the first server blade is unavailable;
wherein the unique subscriber identifier is either an International Mobile Subscriber Identity (IMSI) or a Temporary Mobile Subscriber Identity (TMSI), and the determining steps determine the same first and second hash values regardless of whether the IMSI or the TMSI is received.

2. The method according to claim 1, wherein the determination of said first and second server blades includes mapping the first and second hash values onto respective value ranges associated with blades of said blade cluster.

3. The method according to claim 1, wherein the determination of a first server blade and the determination of a second server blade takes into account the processing power of the available server blades.

4. The method according to claim 1, further comprising the steps of checking the availability of said determined first and second server blades and forwarding said message towards said first server blade if said server blade is active.

5. The method according to claim 4, wherein when said first server blade is inactive, said message is forwarded to said second server blade.

6. The method according to claim 4, wherein the availability of said blade server is checked via a flag indicating the availability for all or some subscribers.

7. A Distributor entity for providing scalability and redundancy in a blade cluster of a telecommunication system, the blade cluster acting towards the telecommunication system as a single Mobile Switching Center (MSC) and comprising a plurality of server blades, a server blade offering MSC-Server functionality, the distributor entity comprising:
a receiver configured to receive from the telecommunication system, a message relating to a subscriber, the message including a unique subscriber identifier; and
a processor configured to determine from the received message:
a first hash value and a second hash value, utilizing the unique subscriber identifier;
a first server blade of the blade cluster, based on the first hash value; and
a second server blade of the blade cluster, based on the second hash value, while excluding the first server blade;
wherein the second server blade serves the subscriber when the first server blade is unavailable; and
wherein the unique subscriber identifier is either an International Mobile Subscriber Identity (IMSI) or a Temporary Mobile Subscriber Identity (TMSI), and the processor is configured to determine the same first and second hash values regardless of whether the IMSI or the TMSI is received.

8. The Distributor entity according to claim 7, wherein the processor is configured to map the first and second hash values onto respective value ranges associated with blades of said blade cluster.

9. The Distributor entity according to claim 7, wherein the processor is configured to take the processing power of the available server blades into account while determining the first and second server blades.

10. The Distributor entity according to claim 7, wherein the processor is configured to check the availability of said determined first and second server blades and to forward said message towards said first server blade if said server blade is active.

11. The Distributor entity according to claim 10, whereby if said first server blade is inactive, the processor is configured to forward said message to said second server blade.

12. The Distributor entity according to claim 10, wherein the availability of said blade server is checked via a flag indicating the availability for all or some subscribers.

* * * * *

UNITED STATES PATENT AND TRADEMARK OFFICE
CERTIFICATE OF CORRECTION

PATENT NO. : 8,214,479 B2  
APPLICATION NO. : 12/594439  
DATED : July 3, 2012  
INVENTOR(S) : Luessem et al.

Page 1 of 1

It is certified that error appears in the above-identified patent and that said Letters Patent is hereby corrected as shown below:

On the Title Page, in Item (75), under "Inventors", in Column 1, Line 3, delete "Aachen" and insert -- Herzogenrath --, therefor.

Signed and Sealed this
Eighteenth Day of December, 2012

David J. Kappos  
*Director of the United States Patent and Trademark Office*